(12) United States Patent
Yamane et al.

(10) Patent No.: US 11,011,134 B2
(45) Date of Patent: May 18, 2021

(54) NON-TRANSITORY STORAGE MEDIUM ENCODED WITH INFORMATION PROCESSING PROGRAM READABLE BY COMPUTER OF INFORMATION PROCESSING APPARATUS WHICH CAN ENHANCE ZEST, INFORMATION PROCESSING APPARATUS, METHOD OF CONTROLLING INFORMATION PROCESSING APPARATUS, AND INFORMATION PROCESSING SYSTEM

(71) Applicant: NINTENDO CO., LTD., Kyoto (JP)

(72) Inventors: Tomoyoshi Yamane, Kyoto (JP); Gwennael Arbona, Paris (FR)

(73) Assignee: Nintendo Co., Ltd., Kyoto (JP)

( * ) Notice: Subject to any disclaimer, the term of this patent is extended or adjusted under 35 U.S.C. 154(b) by 172 days.

(21) Appl. No.: 15/846,509

(22) Filed: Dec. 19, 2017

(65) Prior Publication Data

US 2018/0374449 A1 Dec. 27, 2018

(30) Foreign Application Priority Data

Jun. 22, 2017 (JP) .............................. JP2017-122383

(51) Int. Cl.
*A63F 13/00* (2014.01)
*G09G 5/06* (2006.01)
(Continued)

(52) U.S. Cl.
CPC .............. *G09G 5/06* (2013.01); *A63F 13/25* (2014.09); *A63F 13/424* (2014.09); *A63F 13/52* (2014.09);
(Continued)

(58) Field of Classification Search
CPC . G07F 17/329; G07F 17/3267; G07F 17/3293
See application file for complete search history.

(56) References Cited

U.S. PATENT DOCUMENTS

2003/0023547 A1* 1/2003 France ................... G06Q 20/10
705/39
2005/0237345 A1 10/2005 Mizumaki et al.
(Continued)

FOREIGN PATENT DOCUMENTS

JP 2005-331908 A 12/2005
JP 2008-102233 A 5/2008
(Continued)

OTHER PUBLICATIONS

Qbertgame manual http://pdf.textfiles.com/manuals/ARCADE/K-R/Q-Bert%20(Scan%202)%20[Instructions]%20[English].pdf.*
(Continued)

*Primary Examiner* — Omkar A Deodhar
*Assistant Examiner* — Eric M Thomas
(74) *Attorney, Agent, or Firm* — Nixon & Vanderhye PC (57) ABSTRACT

A non-transitory storage medium encoded with an information processing program executed by a computer of an information processing apparatus connected to a display including first and second display areas according to one aspect, the information processing program causing the computer to perform first representation processing for showing a first image in the first display area and second representation processing for showing a second image in the second display area. In the second representation processing,
(Continued)

a color of the second image in the second display area is changed based on the first image shown in the first display area.

16 Claims, 10 Drawing Sheets

(51) Int. Cl.
    *A63F 13/52*      (2014.01)
    *A63F 13/25*      (2014.01)
    *A63F 13/54*      (2014.01)
    *G09G 5/02*      (2006.01)
    *A63F 13/424*      (2014.01)
    *A63F 13/53*      (2014.01)

(52) U.S. Cl.
    CPC .............. *A63F 13/53* (2014.09); *A63F 13/54* (2014.09); *G09G 5/024* (2013.01); *G09G 2310/0232* (2013.01); *G09G 2320/0285* (2013.01); *G09G 2320/0666* (2013.01); *G09G 2320/0686* (2013.01)

(56) References Cited

U.S. PATENT DOCUMENTS

| | | | | |
|---|---|---|---|---|
| 2006/0211470 | A1* | 9/2006 | Walker | G07F 17/32 |
| | | | | 463/16 |
| 2008/0056563 | A1* | 3/2008 | Schiller | G06N 20/10 |
| | | | | 382/159 |
| 2008/0132314 | A1* | 6/2008 | Robb | G07C 15/005 |
| | | | | 463/17 |
| 2009/0015593 | A1 | 1/2009 | Kang et al. | |
| 2013/0050076 | A1* | 2/2013 | Hong | G06F 3/0304 |
| | | | | 345/157 |
| 2016/0364888 | A1* | 12/2016 | Jeon | G09G 3/2003 |

FOREIGN PATENT DOCUMENTS

| | | |
|---|---|---|
| JP | 2015-182482 A | 10/2015 |
| JP | 2015-223477 | 12/2015 |

OTHER PUBLICATIONS

Communication dated Jan. 12, 2021 in JP counterpart application (see global dossier).

* cited by examiner

FIG.10

NON-TRANSITORY STORAGE MEDIUM ENCODED WITH INFORMATION PROCESSING PROGRAM READABLE BY COMPUTER OF INFORMATION PROCESSING APPARATUS WHICH CAN ENHANCE ZEST, INFORMATION PROCESSING APPARATUS, METHOD OF CONTROLLING INFORMATION PROCESSING APPARATUS, AND INFORMATION PROCESSING SYSTEM

This nonprovisional application is based on Japanese Patent Application No. 2017-122383 filed with the Japan Patent Office on Jun. 22, 2017, the entire contents of which are hereby incorporated by reference.

FIELD

The present disclosure relates to processing for controlling representation on an information processing apparatus.

BACKGROUND AND SUMMARY

A scheme for showing an edge at an end of a display area for showing game information and showing edges different between normal representation and highlighted representation is disclosed as a scheme for enhancing zest in a game machine in a conventional game hall.

The scheme, however, merely provides change in edge between the normal representation and the highlighted representation, and there is a room for further enhancement of zest.

An attempt to solve the problem as above was made, and a non-transitory storage medium encoded with an information processing program readable by a computer of an information processing apparatus which can enhance zest, an information processing apparatus, a method of controlling an information processing apparatus, and an information processing system are provided.

A non-transitory storage medium encoded with an information processing program executed by a computer of an information processing apparatus connected to a display including first and second display areas according to one aspect, the information processing program causing the computer to perform first representation processing for showing a first image in the first display area and second representation processing for showing a second image in the second display area. In the second representation processing, a color of the second image in the second display area is changed based on the first image shown in the first display area.

Since the color of the second image in the second display area is changed based on the first image shown in the first display area, relation between the first image and the second image is readily recognized and zest can be enhanced.

In the exemplary embodiment, in the first representation processing, the first image is changed over time. In the second representation processing, the color of the second image may be changed over time with change in first image.

Since the color of the second image is also changed in coordination with the first image which is changed over time, the color of the second image is dynamically changed and zest can be enhanced.

In the exemplary embodiment, in the second representation processing, a color of the first image shown in the first display area may be extracted, and the color of the second image in the second display area may be changed based on the extracted color.

Since the color of the second image in the second display area is changed based on the color of the first image shown in the first display area, relation between the first image and the second image is readily recognized and zest can be enhanced.

In the exemplary embodiment, in the first representation processing, the first image is changed over time. In the second representation processing, the color of the first image shown in the first display area may repeatedly be extracted and the color of the second image in the second display area may repeatedly be changed based on the extracted color.

Since the color of the second image is also changed in coordination with the color of the first image which is changed over time, the color of the second image is dynamically changed and zest can be enhanced.

In the exemplary embodiment, in the second representation processing, a color highest in area ratio of colors of the first image shown in the first display area may be extracted and the color of the second image in the second display area may be changed based on the extracted color.

Since a color highest in area ratio of colors of the first image is extracted and the color of the second image is changed based on the extracted color, change is readily recognized and zest can be enhanced.

In the exemplary embodiment, in the second representation processing, the color of the second image in the second display area may be changed based on the extracted color and a color circle table.

Since the color of the second image is changed based on the color circle table, operation processing is readily performed and processing load can be mitigated.

In the exemplary embodiment, in the second representation processing, at least one of a hue, a saturation, and a value of the second image in the second display area may be changed based on the extracted color.

At least one of a hue, a saturation, and a value can be changed and a variety of types of changes are available. Therefore, zest can be enhanced.

In the exemplary embodiment, in the first representation processing, the first image based on an application program may be shown in the first display area, and in the second representation processing, the second image for decoration of the first image may be shown in the second display area.

By showing the second image for decoration of the first image, the first image is further distinguished and zest can be enhanced.

In the exemplary embodiment, audio processing for outputting voice and sound is further performed. In the second representation processing, the color of the second image in the second display area may be changed based on the first image shown in the first display area and the voice and sound output in the audio processing.

Zest can be enhanced by changing the color of the second image based on the first image and the voice and sound.

In the exemplary embodiment, in the second representation processing, a mask area where the color of the second image is not changed may be provided in the second display area.

Processing load can be mitigated by providing a mask area.

An information processing apparatus connected to a display including first and second display areas according to one aspect includes a processor. The processor performs first representation processing for showing a first image in the first display area and second representation processing for showing a second image in the second display area. In the second representation processing, a color of the second image in the second display area is changed based on the first image shown in the first display area.

A method of controlling an information processing apparatus connected to a display including first and second display areas includes showing a first image in the first display area and showing a second image in the second display area. The showing a second image includes changing a color of the second image in the second display area based on the first image shown in the first display area.

Since the color of the second image in the second display area is changed based on the first image shown in the first display area, relation between the first image and the second image is readily recognized and zest can be enhanced.

An information processing system according to one aspect includes a display including first and second display areas, a first representation control device which has a first image shown in the first display area, and a second representation control device which has a second image shown in the second display area. The second representation control device changes a color of the second image in the second display area based on the first image shown in the first display area.

Since the color of the second image in the second display area is changed based on the first image shown in the first display area, relation between the first image and the second image is readily recognized and zest can be enhanced.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

This embodiment will be described in detail with reference to the drawings. The same or corresponding elements in the drawings have the same reference characters allotted and description thereof will not be repeated.

An information processing apparatus in the present embodiment may be a portable (also referred to as mobile) device such as a portable game device, a portable telephone, or a smartphone, a stationary device such as a personal computer or a home game console, or a large apparatus such as an arcade game machine. In the present example, a game device representing one example of an information processing apparatus will be described by way of example.

First Embodiment

<Configuration of Game Device>

Figure 1:
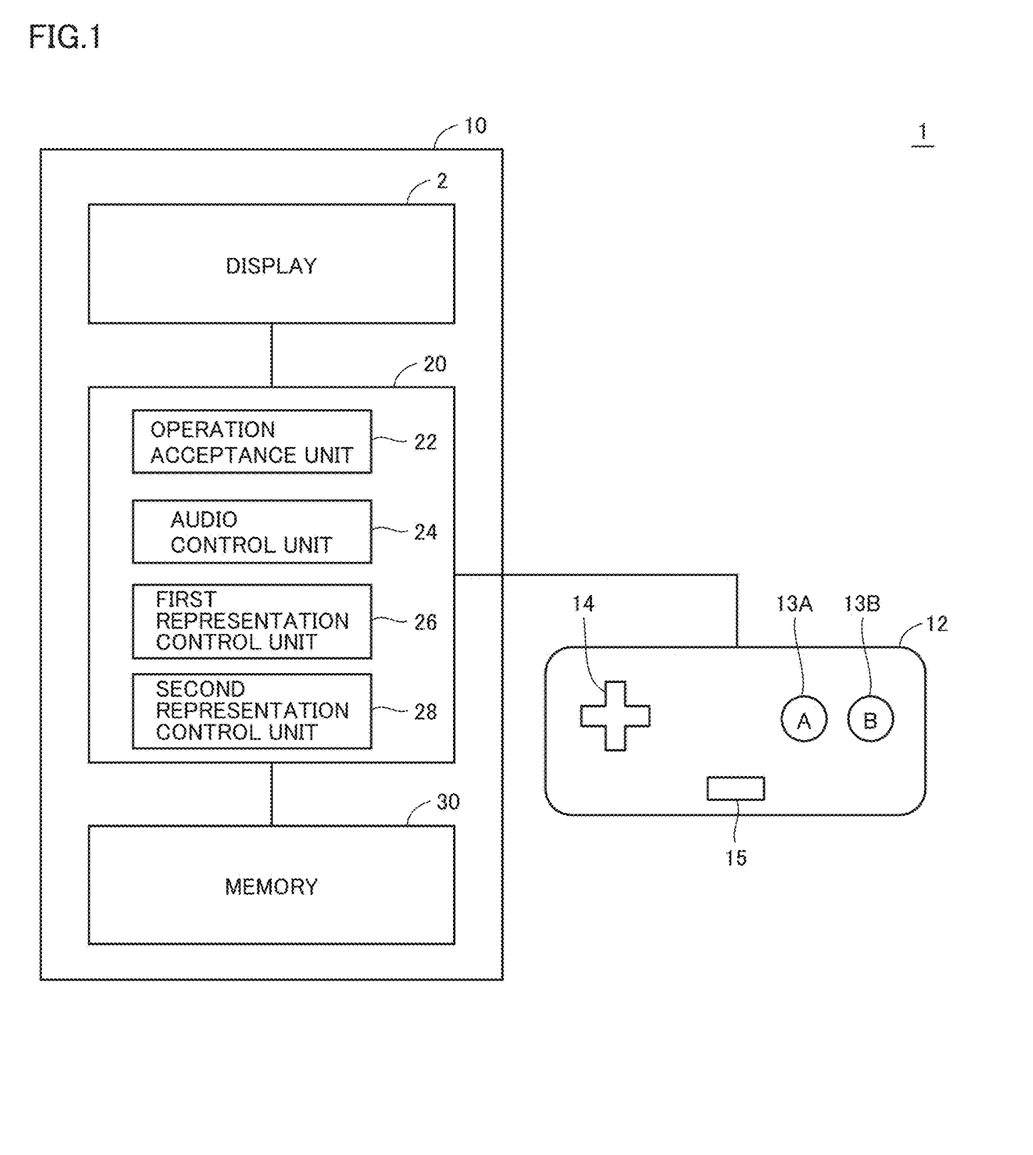
FIG. 1 is a schematic block diagram of a configuration of a game device 1 based on a first embodiment.

FIG. 1 is a schematic block diagram of a configuration of a game device 1 based on a first embodiment.

As shown in FIG. 1, game device 1 includes a game device main body 10 and a console 12.

Game device main body 10 includes a display 2, a CPU 20, and a memory 30.

CPU 20 is an information processing unit for performing various types of information processing performed in game device 1. CPU 20 performs the various types of information processing with the use of memory 30. Memory 30 stores various programs (including a game program and a main body program) executed in game device 1. Though an example where memory 30 is implemented by a storage contained in game device 1 will be described, it may be implemented, for example, by a storage medium which can be attached to or removed from game device 1 such as an optical disc or a cartridge, or both of the storage and the storage medium.

In the present embodiment, in game device 1, memory 30 stores two types of programs which are at least a game program and a main body program.

The game program may be, for example, a game program which reads game data and performs game processing by using the game data.

The main body program is a program for controlling a game program. It provides an interface screen for performing a prescribed operation on a game program.

CPU 20 implements various functional blocks based on the main body program stored in memory 30.

CPU 20 includes an operation acceptance unit 22, an audio control unit 24, a first representation control unit 26, and a second representation control unit 28.

Operation acceptance unit 22 accepts a prescribed operation from console 12.

Audio control unit 24 performs audio output processing in game processing based on a game program. Specifically, audio output is provided from a not-shown speaker or the like.

First representation control unit 26 has display 2 show a game image (a first image), the game image being generated based on execution of the game program.

Second representation control unit 28 has an edge (a second image) shown, the edge being generated around the game image based on execution of the main body program.

Display 2 shows an image generated as a result of information processing by first and second representation control units 26 and 28.

Console 12 accepts an operation instruction given by a user such as an input through a button or a key.

An operation instruction accepted in console 12 is output to CPU 20.

Console 12 includes a cross-shaped key 14, an A button 13A, a B button 13B, and a select (SELECT) button 15 as input apparatuses.

Game device 1 may be implemented by a plurality of apparatuses. For example, game device 1 may be implemented by a main body apparatus having CPU 20 and an apparatus having console 12 and/or display 2, which are separate from each other. For example, in another embodiment, game device 1 may be implemented by a main body apparatus and a game device having console 12 and display 2, or by a main body apparatus and an operation apparatus having console 12. Game device 1 may employ a television as a display apparatus, without including display 2.

<Configuration of Display 2>

Figure 2:
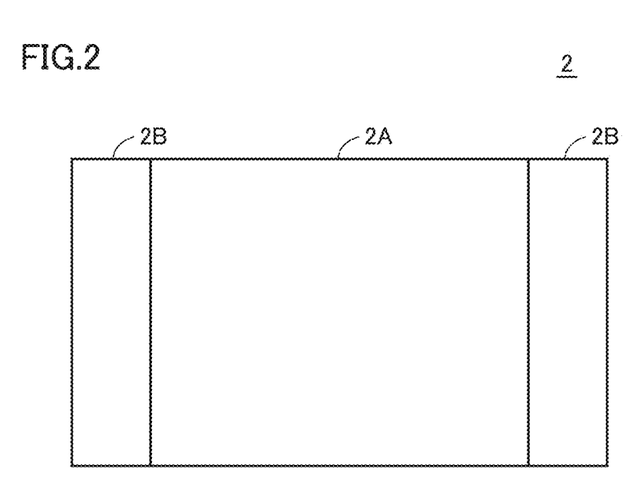
FIG. 2 is a diagram illustrating a configuration of a display 2 based on the first embodiment.

FIG. 2 is a diagram illustrating a configuration of display 2 based on the first embodiment.

As shown in FIG. 2, display 2 is provided with a first display area 2A and a second display area 2B.

Second display area 2B is provided at each of left and right ends of first display area 2A.

Though second display area 2B is provided at each of left and right edges of first display area 2A by way of example, limitation thereto is not particularly intended, and for example, second display area 2B may be provided at each of upper, lower, left, and right edges of first display area 2A so as to surround first display area 2A.

Second display area 2B is provided as a decorative edge of first display area 2A.

In the present example, a color of a second image shown in second display area 2B is changed based on a first image shown in first display area 2A.

<Description of Display Area of Display 2>

Figure 3:
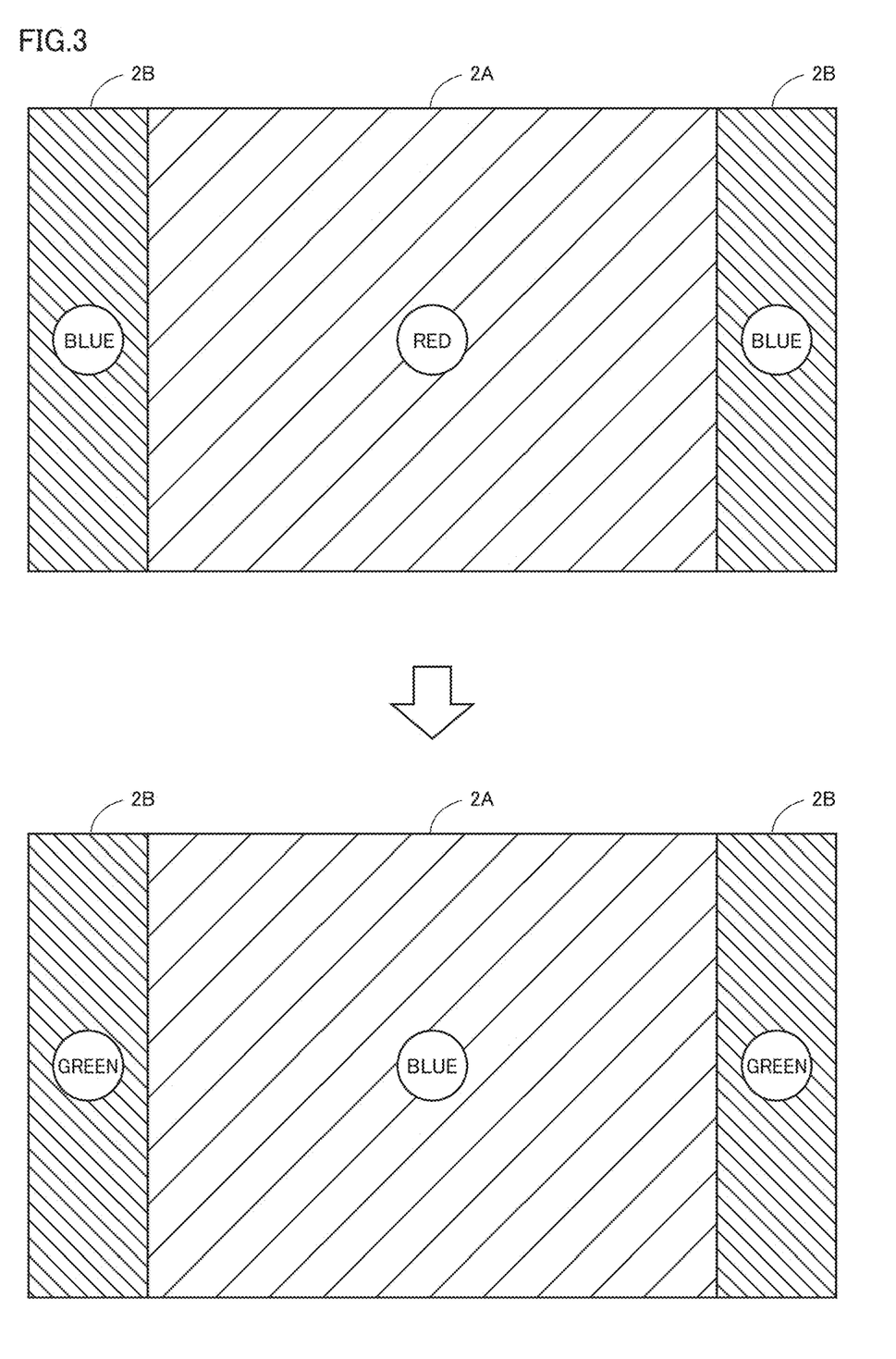
FIG. 3 is a diagram illustrating change in display area based on the first embodiment.

FIG. 3 is a diagram illustrating change in first and second display areas based on the first embodiment.

As shown in FIG. 3, by way of example, the first image of which background color is red is shown in first display area 2A. In this case, a dominant color is red.

In second display area 2B, the second image as an edge of which background color is blue is shown.

Then, in first display area 2A, the first image of which background color is blue is shown, owing to a game image generated based on execution of a game program. In this case, a dominant color is blue.

In second display area 2B, with change from red to blue in dominant color of the first image in first display area 2A, a color of the second image is changed. In the present example, the edge of which background color is blue makes transition to the edge of which background color is green.

Therefore, the color of the second image in second display area 2B is changed in coordination with change in color of the first image in first display area 2A.

Thus, for example, since the color of the second image in second display area 2B is changed in coordination with change in scene of the game image shown in first display area 2A, a sense of realism or dynamism can be enhanced and zest can be enhanced.

Burn-in of a screen can also be suppressed by changing the color of the second image in second display area 2B.

<Dominant Color of First Display Area 2A>

Figure 4:
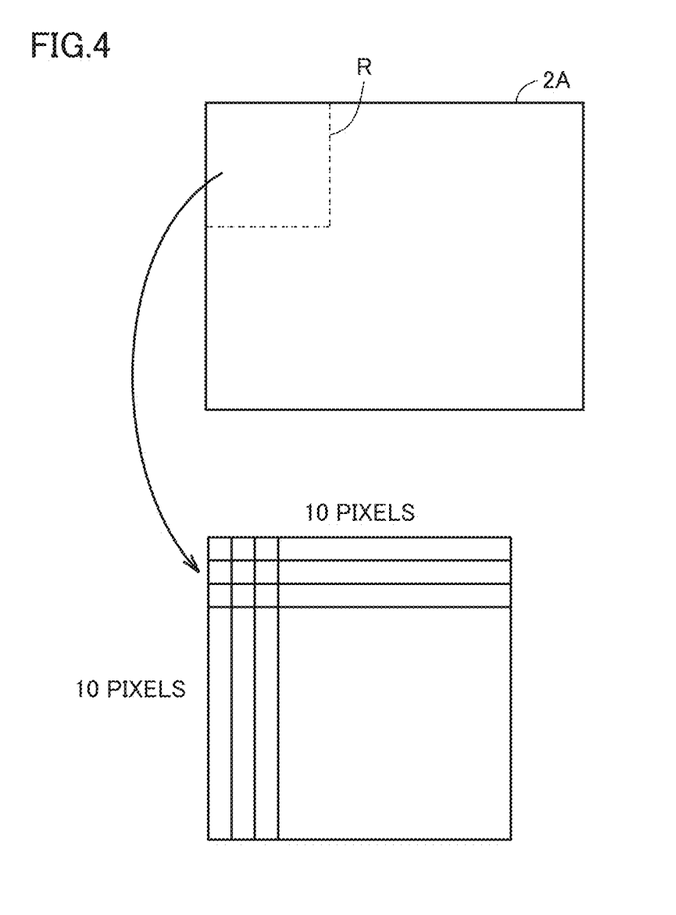
FIG. 4 is a diagram illustrating a scheme for specifying a dominant color of a first display area 2A based on the first embodiment.

FIG. 4 is a diagram illustrating a scheme for specifying a dominant color of first display area 2A based on the first embodiment.

As shown in FIG. 4, by way of example, a prescribed region R in first display area 2A is selected and extracted.

By way of example, prescribed region R is defined by 10×10 pixels at an upper left end of first display area 2A.

Prescribed region R is not limited to the 10×10 pixels, and can also naturally be smaller or greater in area than those.

One pixel is extracted from prescribed region R as a representative pixel.

In the present example, a plurality of prescribed regions R in first display area 2A are selected, and one pixel is extracted as a representative pixel from each prescribed region R.

Then, a dominant color is specified based, for example, on 100 representative pixels extracted from the plurality of prescribed regions R. A dominant color may be specified with all pixels in first display area 2A being regarded as representative pixels.

Conversion from an RGB (red, green, blue) color space to an HSV (hue, saturation, value) color space is performed for each representative pixel.

Figure 5:
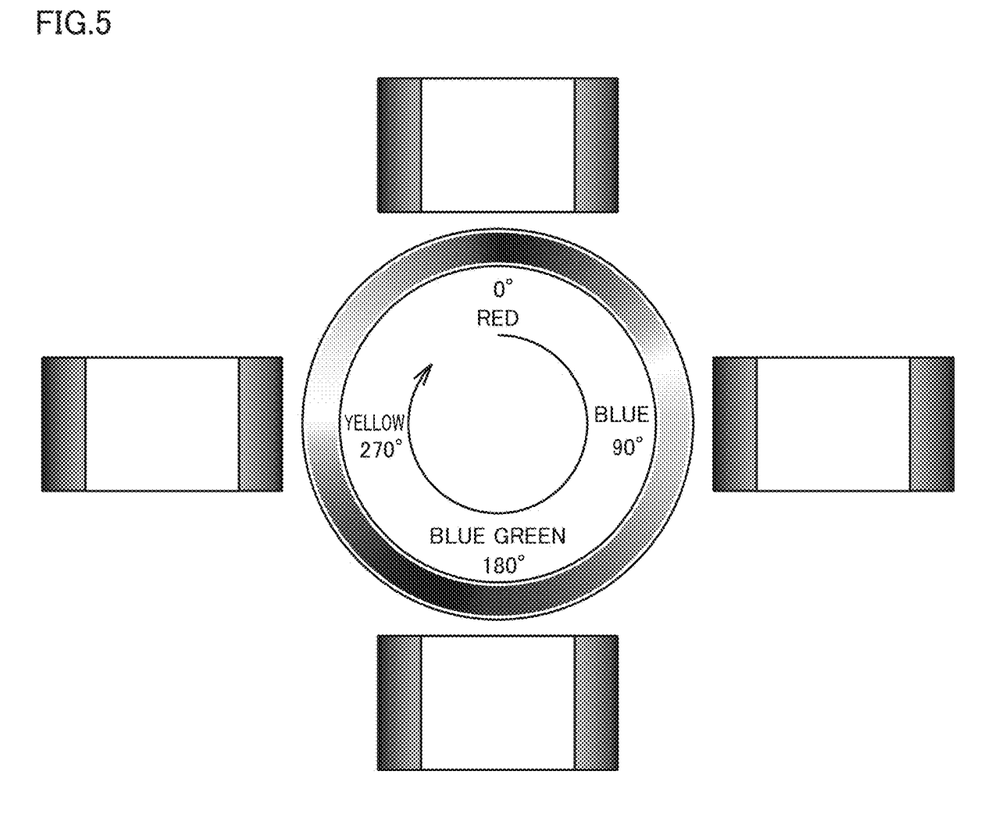
FIG. 5 is a diagram illustrating a color circle table based on the first embodiment.

FIG. 5 is a diagram illustrating a color circle table based on the first embodiment.

As shown in FIG. 5, a hue is expressed by an angle along a color circle showing hues. By way of example, the color circle table from 0° to 360° is shown.

With red (0°) being defined as the reference, blue (90°), blue green (180°), and yellow (270°) are shown.

By way of example, in the present example, a 360° color circle table is divided into 64 hues (angles) and a score is given to a closest hue for 100 representative pixels. Then, the hue highest in score in the histogram is set as the dominant color.

A saturation and a value are also calculated under a prescribed scheme.

<Process Flow>

Figure 6:
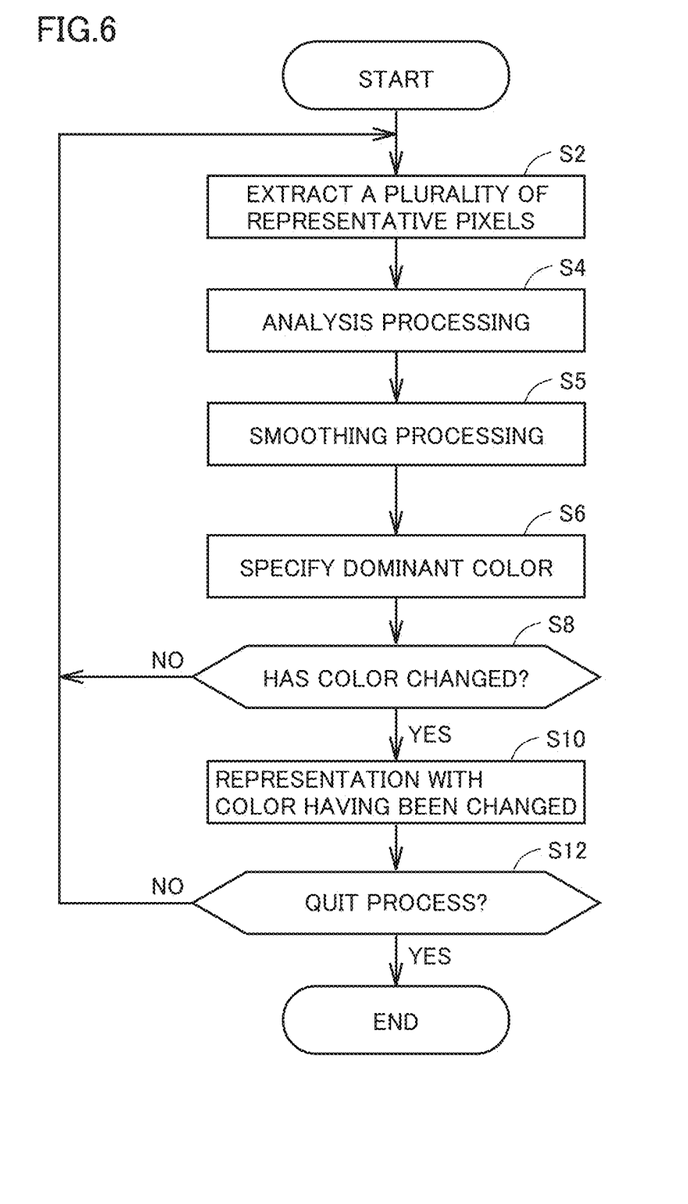
FIG. 6 is a diagram illustrating a process flow for representation on game device 1 based on the first embodiment.

FIG. 6 is a diagram illustrating a process flow for representation on game device 1 based on the first embodiment.

Representation processing is mainly performed by CPU 20.

As shown in FIG. 6, CPU 20 extracts a plurality of representative pixels from a plurality of prescribed regions R (step S2). Specifically, second representation control unit 28 extracts a plurality of representative pixels from the plurality of prescribed regions R in first display area 2A. By way of example, 100 representative pixels are extracted.

Then, CPU 20 performs analysis processing (step S4). Specifically, second representation control unit 28 converts the extracted 100 representative pixels from the RGB color space to the HSV color space. Then, second representation control unit 28 prepares a histogram of 64 hue values for the 100 representative pixels.

Specifically, second representation control unit 28 specifies a hue value highest in score from the histogram of 64 hue values.

Then, CPU 20 performs smoothing processing (step S5). Specifically, second representation control unit 28 smoothes the specified hue value over time with the exponential moving average method. Quality of images can be improved through the processing.

Then, CPU 20 specifies a dominant color (step S6).

Specifically, second representation control unit 28 specifies the smoothed hue value as the dominant color for first display area 2A.

Then, CPU 20 determines whether or not the color of first display area 2A has changed (step S8). Specifically, second representation control unit 28 determines whether or not the dominant color of first display area 2A has changed.

When CPU 20 determines that the color of first display area 2A has changed (YES in step S8), it changes the color of second display area 2B (step S10). Specifically, second representation control unit 28 changes the color of the second image in second display area 2B. At this point, each pixel in second display area 2B is converted from the RGB color space to the HSV color space.

Second representation control unit 28 changes an angle of the hue (H) of each pixel in second display area 2B in accordance with change in dominant color (angle value) of first display area 2A. For example, change in dominant color of second display area 2A from red (0°) to blue (90°) by 90° is considered.

When the hue (H) of the second image in second display area 2B is blue (90°), second representation control unit 28 changes the hue (H) to green (180°) by changing the hue by 90°.

Then, second representation control unit 28 reverse-converts each pixel in second display area 2B from the HSV color space to the RGB color space and has the second image shown.

Through this processing, the color of the second image in second display area 2B changes in coordination with change in color of the first image in first display area 2A.

Then, CPU 20 determines whether or not to quit the process (step S12).

When CPU 20 determines in step S12 to quit the process (YES in step S12), the process ends (end).

When CPU 20 determines in step S12 not to quit the process (NO in step S12), the process returns to step S2 and the process above is repeated.

When CPU 20 determines in step S8 that the color of first display area 2A has not changed (NO in step S8), the process returns to step S2 and the process above is repeated.

Therefore, first representation control unit 26 changes the first image over time based on execution of the game program. Second representation control unit 28 repeatedly extracts the color (dominant color) of the first image shown in first display area 2A and repeatedly changes the color of the second image in second display area 2B based on change in extracted color.

Second representation control unit 28 does not change the hue of the second image in second display area 2B based on prepared data but automatically extracts the color of the first image shown in first display area 2A under the control by first representation control unit 26 and changes the hue of the second image based on change in extracted color.

Thus, the color of the second image (edge) in second display area 2B changes in response to change in game image shown in first display area 2A and zest can be enhanced.

Though a scheme for performing conversion from the RGB color space to the HSV color space, detecting change in hue, and changing the color of the second image in the second display area is described above, limitation to the HSV color space is not particularly intended, and conversion to a YUV color space or another color space is also similarly applicable. Though conversion of the color space to another color space and subsequent reverse conversion are described, the color of the second image in second display area 2B may be changed without converting the RGB color space to another color space.

Though change in hue is mainly used for change in color of the first image shown in first display area 2A above, limitation to change in hue is not intended. The color of the second image in second display area 2B may be changed by changing a saturation or a value. Combination of these approaches is also applicable.

Though change in color of the second image in second display area 2B in response to change in color of the first image shown in first display area 2A is described above, limitation to change in color of the first image is not intended. For example, the color of the second image in second display area 2B may be changed based on the first image. For example, when there are a plurality of types of patterns in the first image, the color of the second image may be changed in accordance with each pattern.

(Modification)

Figure 7:
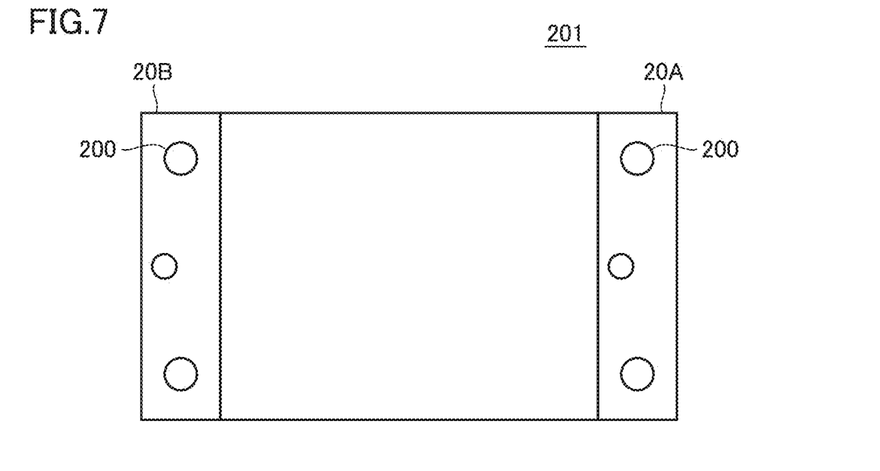
FIG. 7 is a diagram illustrating mask data based on a modification of the first embodiment.

FIG. 7 is a diagram illustrating mask data based on a modification of the first embodiment.

Mask data based on the modification of the first embodiment is shown in FIG. 7.

Specifically, mask data 201 for mask processing of each of first and second display areas 2A and 2B is shown. Mask data 201 includes mask regions 20A and 20B.

A plurality of non-mask regions 200 where mask processing is not performed are provided in each of mask regions 20A and 20B.

Non-mask region 200 serves as a display area.

In the modification of the first embodiment, second representation control unit 28 applies mask data 201 to second display area 2B. Thus, the second image is shown in a part of non-mask region 200.

By performing the mask processing, second representation control unit 28 can lessen load imposed by processing for representation in second display area 2B. An edge high in design quality can be shown by setting mask data 201 as appropriate, and zest can further be enhanced.

Second Embodiment

The first embodiment describes change in color of the second image shown in second display area 2B in coordination with change in color of the first image shown in first display area 2A.

Regarding a game image, in general, audio output is also provided together with a game image.

Audio control unit 24 has a not-shown speaker or the like provide audio output based on execution of a game program.

A second embodiment describes change in second image in second display area 2B in response to audio output.

Figure 8A:
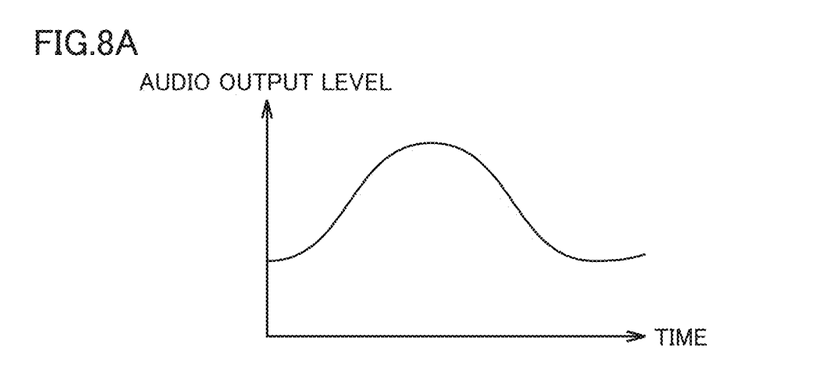
FIGS. 8A and 8B are diagrams illustrating change in audio output level and change in value of a second image in a second display area 2B based on a second embodiment.
Figure 8B:
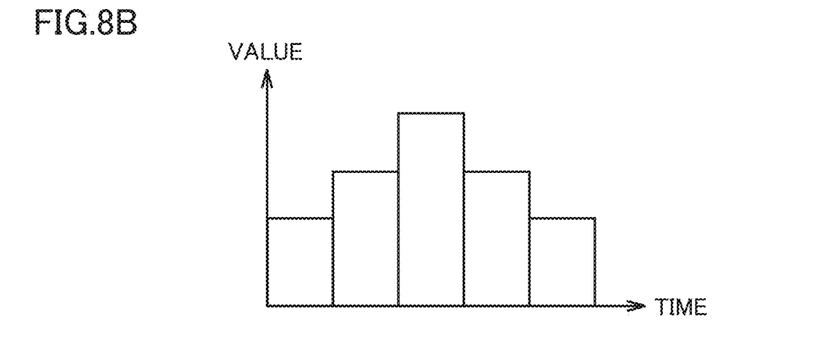

FIGS. 8A and 8B are diagrams illustrating change in audio output level and change in value of the second image in second display area 2B based on the second embodiment.

As shown in FIG. 8A, the audio output level changes over time based on execution of a game program. The audio output level becomes higher or lower with scene change.

In FIG. 8B, a value of the second image shown in second display area 2B is changed in coordination with the audio output level.

<Process Flow>

Figure 9:
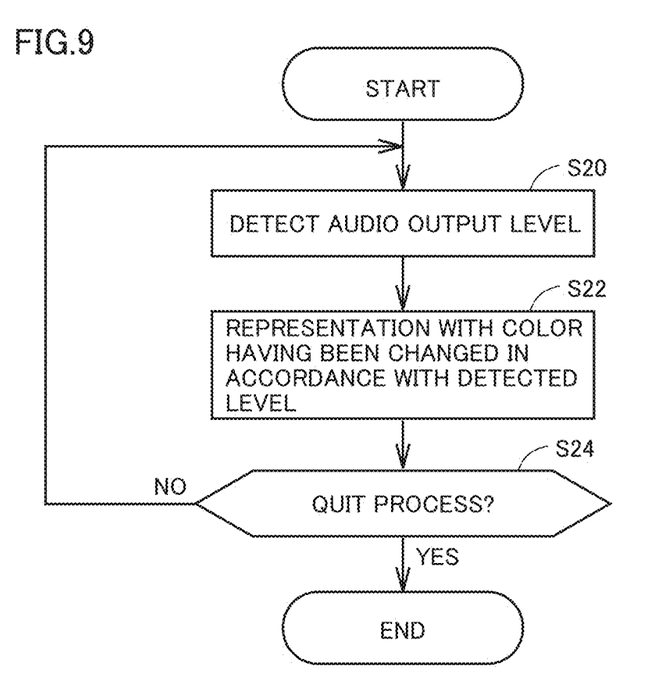
FIG. 9 is a diagram illustrating a process flow for representation on game device 1 based on the second embodiment.

FIG. 9 is a diagram illustrating a process flow for representation on game device 1 based on the second embodiment.

The processing is mainly performed by CPU 20.

As shown in FIG. 9, CPU 20 detects an audio output level (step S20). Specifically, second representation control unit 28 detects a level of audio output provided from audio control unit 24.

Then, CPU 20 changes the color of second display area 2B in accordance with the detected level (step S22). Specifically, second representation control unit 28 changes the color of the second image in second display area 2B in accordance with the detected level. At this point, each pixel in second display area 2B is converted from the RGB color space to the HSV color space.

Second representation control unit 28 changes the value (V) of each pixel in second display area 2B in accordance with the level of audio output provided from audio control unit 24. For example, when the audio output level is higher than a prescribed reference value, the value (V) is also increased. In contrast, when the audio output level is lower than the prescribed reference value, the value (V) is also decreased.

Then, second representation control unit 28 reverse-converts each pixel in second display area 2B from the HSV color space to the RGB color space and has the second image shown.

Through this processing, the color of the second image in second display area 2B changes in coordination with change in level of audio output provided together with the first image shown in first display area 2A.

Then, CPU 20 determines whether or not to quit the process (step S24).

When CPU 20 determines in step S24 to quit the process (YES in step S24), the process ends (end).

When CPU 20 determines in step S24 not to quit the process (NO in step S24), the process returns to step S20 and the process above is repeated.

Therefore, audio control unit 24 changes the audio output level over time based on execution of the game program. Second representation control unit 28 detects the level of audio output provided from audio control unit 24 and repeatedly changes the color of the second image in second display area 2B based on change in detected audio output level.

Thus, the color of the second image (edge) in second display area 2B is changed in response to change in audio output provided together with the game image shown in first display area 2A and zest can be enhanced.

In the present example, since the value of the second image also increases with increase in audio output level, highlighted representation can be provided.

Though change in color of the second image based on the level of audio output provided from audio control unit 24 is described in the present example, combination with the first embodiment is naturally applicable.

(Modification)

Though the second embodiment describes change in color of the second image based on the level of audio output provided from audio control unit 24, limitation to change in color is not intended. For example, the second image can also be changed through animation processing.

Figure 10:
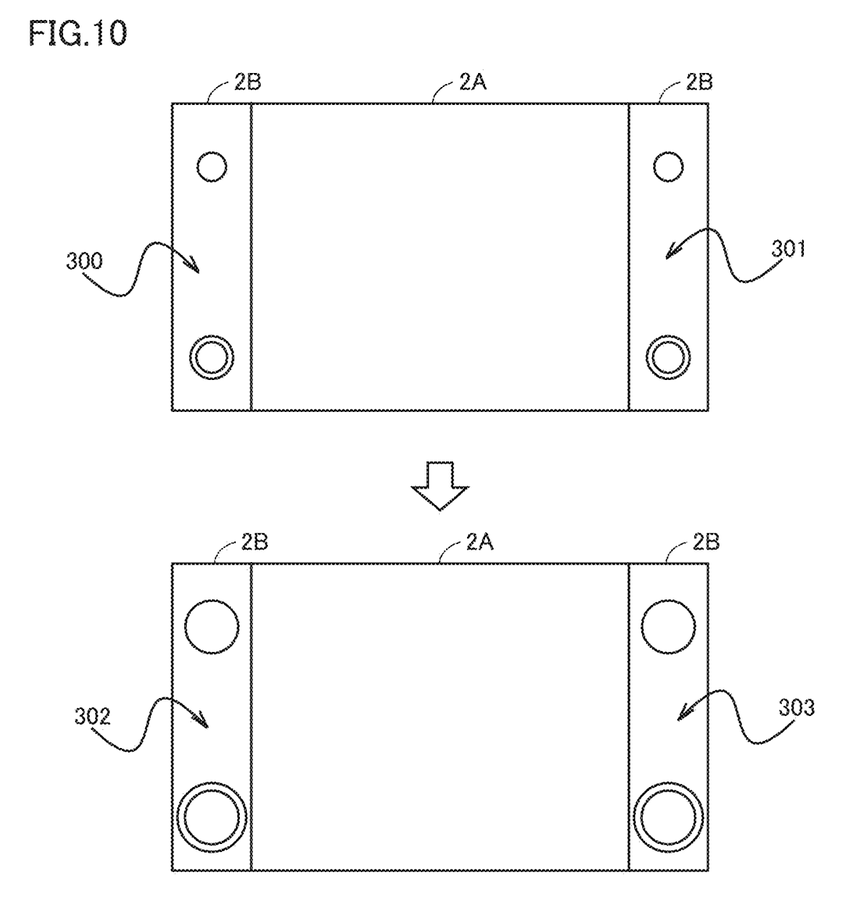
FIG. 10 is a diagram illustrating animation processing for the second image in second display area 2B based on a modification of the second embodiment.

FIG. 10 is a diagram illustrating animation processing for the second image in second display area 2B based on a modification of the second embodiment.

As shown in FIG. 10, speaker objects 300 and 301 are shown in second display area 2B.

In the present example, speaker objects 300 and 301 are changed through animation processing.

Specifically, in response to change in audio output provided together with the game image shown in first display area 2A, speaker objects 300 and 301 in second display area 2B are changed to speaker objects 302 and 303.

Speaker objects 302 and 303 are enlarged versions of a cone shape of speaker objects 300 and 301.

By way of example, the speaker objects are changed in response to the level of audio output provided from audio control unit 24.

When the level of audio output provided from audio control unit 24 is equal to or higher than a prescribed reference value, speaker objects 302 and 303 are shown.

When the level of audio output provided from audio control unit 24 is lower than the prescribed reference value, speaker objects 300 and 301 are shown.

Switching between the speaker objects is made in accordance with the level of audio output from audio control unit 24.

Second representation control unit 28 switches between the speaker objects in second display area 2B in response to the level of audio output provided from audio control unit 24.

The second image in second display area 2B changes in response to change in audio output provided together with the game image shown in first display area 2A and zest can be enhanced.

In the present example, the speaker object shown as the second image changes with increase in audio output level. In the present example, since the cone shape is increased in size, a sense of realism or dynamism can be enhanced and zest can be enhanced.

Though the present example describes change in speaker object in accordance with an audio output level, limitation thereto is not intended and an audio waveform at an audio output level shown in FIG. 8A may be shown as the second image in second display area 2B.

Though the present example describes change in second image based on the level of audio output provided from audio control unit 24, the color of the second image may be changed as described above. Combination with the first embodiment is also naturally applicable.

An application executable by a personal computer may be provided as a program in the present embodiment. The program according to the present embodiment may be incorporated as some functions of various applications executed on the personal computer.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A non-transitory storage medium encoded with an information processing program executed by a computer of an information processing apparatus connected to a display including first and second display areas and to a game input device, the information processing program causing the computer to perform game operations at least in part in response to inputs provided by the game input device, the game operations comprising:
   game processing for playing a game;
   first representation processing showing a first image in the first display area, the first image including a changing first color; and
   second representation processing showing a second image in the second display area,
   in the second representation processing, extracting the changing first color of the first image shown in the first display area, and
   in the second representation processing, changing a second color of the second image in the second display area based on the changing first color extracted from the first image shown in the first display area, wherein the hue of second color is other than the hue of the first color.

2. The storage medium according to claim 1, wherein
   in the first representation processing, the first color is changed over time, and in the second representation processing, the second color of the second image is changed over time by an amount of change in the first color.

3. The storage medium according to claim 1, wherein
in the first representation processing, the first color is changed over time, and
in the second representation processing, the first color of the first image shown in the first display area is repeatedly extracted and the second color of the second image in the second display area is repeatedly changed by an amount of change of the repeatedly extracted first color.

4. The storage medium according to claim 1, wherein
in the second representation processing, a color highest in area ratio of colors of the first image shown in the first display area is extracted as the first color, and the second color of the second image in the second display area is changed by an amount of change of the extracted first color.

5. The storage medium according to claim 1, wherein
in the second representation processing, the second color of the second image in the second display area is changed based on a change amount of the extracted first color and a color circle table.

6. The storage medium according to claim 1, wherein
in the second representation processing, at least one of a hue, a saturation, and a value of the second image in the second display area is changed based on the extracted first color.

7. The storage medium according to claim 1, wherein
in the first representation processing, the first image based on an application program is shown in the first display area, and
in the second representation processing, the second image for decoration of the first image is shown in the second display area.

8. The storage medium according to claim 1, wherein
audio processing for outputting voice and sound is further performed, and
in the second representation processing, the second color of the second image in the second display area is changed based on the first image shown in the first display area and the voice and sound output in the audio processing.

9. The storage medium according to claim 1, wherein
in the second representation processing, a mask area where the second color of the second image is not changed is provided in the second display area.

10. An information processing apparatus connected to a display including first and second display areas, the information processing apparatus comprising a processor connected to a memory storing program instructions, the processor configured to execute the program instructions stored in the memory to perform game processing operations at least in part in response to inputs provided by a game input device, the operations comprising:
  game processing for playing a game;
  first representation processing showing a first image in the first display area, the first image including a changing first color, and
  second representation processing showing a second image in the second display area,
  in the second representation processing, extracting the changing first color of the first image shown in the first display area, and
  in the second representation processing, changing a second color of the second image in the second display area based on the changing first color extracted from the first image shown in the first display area, wherein the hue of the second color is different from the hue of the first color.

11. A method of controlling an information processing apparatus connected to a display including first and second display areas and including a processor connected to a memory storing program instructions, the method comprising executing the stored program instructions with the processor to perform game processing operations at least in part in response to inputs provided by a game input device, the operations comprising:
  showing a first image in the first display area including a changing first color, and showing a second image in the second display area,
  the showing a second image including extracting the changing first color of the first image shown in the first display area, and changing a second color of the second image in the second display area based on the changing first color extracted from the first image shown in the first display area, wherein the hues of the first and second colors are different.

12. An information processing system comprising:
  a display including first and second display areas;
  a memory storing program instructions, and
  a processor connected to the memory, the processor executing the stored program instructions to perform game processing operations at least in part in response to inputs provided by a game input device, the operations comprising,
  a first representation control which has a first image shown in the first display area, the first image including a changing first color; and
  a second representation control which has a second image shown in the second display area,
  the second representation control extracting the changing first color of the first image shown in the first display area, and changing a second color of the second image in the second display area based on the changing first color shown in the first display area, wherein the hue of the second color is different from the hue of the first color.

13. The non-transitory storage medium of claim 1 wherein the second representation processing is configured to extract a plurality of representative pixels from a plurality of prescribed regions R of the first image shown in the first display area.

14. The non-transitory storage medium of claim 13 wherein the second representation processing converts the extracted representative pixels from a first color space to a second color space, and prepares a histogram of hue values for the representative pixels.

15. The non-transitory storage medium of claim 14 wherein the first color space comprises the RGB color space and the second color space comprises the HSV color space.

16. The non-transitory storage medium of claim 14 wherein the second representation processing extracts a plurality of pixels from the first image, generates a color histogram from the plurality of extracted pixels, and uses the color histogram to determine the first color.

* * * * *